3,763,251
PROCESS FOR PREPARING BISORGANOALKA-
LINE EARTH METAL COMPOUNDS FROM
ORGANOLEAD COMPOUNDS
Peter West, Wellesley, and Mary C. Woodville, Milton,
Mass., assignors to The Dow Chemical Company, Midland, Mich.
No Drawing. Filed July 27, 1972, Ser. No. 275,466
Int. Cl. C07f 3/00, 3/04
U.S. Cl. 260—665 R     7 Claims

ABSTRACT OF THE DISCLOSURE

Compounds of the formula $$(R)_{2}M,$$

wherein M is calcium, strontium or barium and R is vinyl, benzyl or alkyl-substituted benzyl are prepared in the novel process comprising contacting calcium, strontium or barium with a solution of $$(R)_{4}Pb$$

in an inert solvent.

As an example, dibenzylcalcium was prepared by contacting a solution of tetrabenzyllead in tetrahydrofuran with metallic calcium for a period of 24 hours at room temperature.

BACKGROUND OF THE INVENTION

Bisorganoalkaline earth metal compounds and a method of preparing them from bisorganomercury reagents were described in our copending application Ser. No. 52,082, filed July 2, 1970 now Pat. No. 3,718,703. The bisorganoalkaline earth metal compounds are useful as polymerization initiators for vinyl monomers (e.g. styrene, acrylonitrile, etc.).

SUMMARY OF THE INVENTION

In our subsequent studies of bisorganoalkaline earth metal compounds, we have discovered a novel way of preparing compounds of the formula $$(R)_{2}M,$$

where M is calcium, strontium or barium and R is vinyl, benzyl or alkyl-substituted benzyl. The novel process comprises reacting by contacting (a) calcium, strontium or barium with (b) a solution of $$(R)_{4}Pb$$

in an inert solvent. The compounds are useful as polymerization initiators for the polymerization of vinyl monomers.

The process proceeds in high conversion and excellent yields. The product is obtained as a solution or suspension in the reaction solvent medium and is easily separated from the metallic residue by simple conventional means.

The molar ratio of reactants is not critical but an excess of calcium, strontium or barium is preferable to insure substantially complete reaction and thus make efficient use of the more expensive organolead reactants.

The organolead reactants are represented by the formula $$(R)_{4}Pb,$$

wherein R has the aforesaid meaning. Examples of suitable such compounds include those wherein R is vinyl, benzyl, ar-methylbenzyl, ar-ethylbenzyl, ar-butylbenzyl, ar-t-amylbenzyl, ar-octylbenzyl, ar-dodecylbenzyl, ar-dimethylbenzyl, and the like. Preferred reactants are tetravinyl and tetrabenzyllead.

The organolead reactants may be prepared by using the appropriate reactants in any of several known processes for preparing vinyl and benzyl derivatives of lead.

The organolead reactants are typically predissolved in a suitable liquid electron donor-type solvent which is inert in the process. Illustrative of such solvents are cyclic aliphatic ethers (e.g. tetrahydrofuran, dioxane, etc.) and the like. Tetrahydrofuran is the preferred solvent.

The reaction temperature is typically selected in the range of from about 0° C. to about 40° C., based on the rate of reaction and stability of product. Temperatures in the range of from about 20° C. to about 30° C. are preferred. Temperatures outside of the 0°–40° range are operable but below about 0° C. the reaction rate is quite low, whereas above about 40° C. the product yield may be lowered by side reactions. Reaction times of from about 8 to about 36 hours are conventional in the above temperature ranges. The reaction times can be shortened in many instances by including a small but catalytic amount of mercuric bromide in the reaction mixture.

In view of the fact that organoalkaline earth metal products react with water and oxygen, the process is advantageously conducted under substantially anhydrous conditions and under an inert atmosphere (e.g. under a blanket of argon).

EXPERIMENTAL

The following examples further illustrate the invention.

Example 1.—Preparation of dibenzylcalcium

Excess calcium, in the form of calcium chips, was placed in a predried vessel filled with an atmosphere of dry argon. Tetrabenzyllead was then introduced into the vessel followed by 4 ml. of dried distilled tetrahydrofuran (THF). The mixture was stirred at room temperature for approximately 24 hours. The reaction mixture was then centrifuged and the clear orange supernatant removed from the black solid precipitate. The nuclear magnetic resonance (NMR) spectrum of the orange supernatant showed it to contain large amounts of dibenzylcalcium, a small amount of residual tetrabenzyllead and very minor amounts of toluene and dibenzyl.

Example 2.—Preparation of divinylcalcium

Using the procedure of Example 1, divinylcalcium was obtained in greater than 90% yield as a dark orange-red supernatant solution in THF by contacting tetravinyllead (0.5 ml.), mercuric bromide (14.5 mg.) and excess finely divided calcium in 5.5 ml. of THF for 5 hours at room temperature. There was essentially no residual tetravinyllead in the solution.

Example 3.—Preparation of divinylstrontium

Using the procedure of Example 2, divinylstrontium was obtained in greater than 90% yield as a saturated dark orange-red supernatant solution in THF by contacting tetravinyllead (0.5 ml.), mercuric bromide (8.6 mg.) and excess finely divided strontium in 5.5 ml. of THF for 19 hours at room temperature. The product precipitated when the solution was transferred to another vessel. No residual tetravinyllead was observed.

Dvinylbarium was similarly prepared but the product was thermally unstable and/or reactive with THF and was not isolated.

The bisorganoalkaline earth metal compounds are known to be useful as polymerization initiators for vinyl polymerizations. One way in which they are typically used is as solutions or suspensions in THF. E.g. polystyrene is obtained by charging 0.2 millimole of dibenzylcalcium to a stirred mixture of 10 millimoles of styrene in 10 ml. THF at 23° C. The reaction is exothermic and quite rapid. Polystyrene is thus obtained in essentially 100% yield. The resulting polystyrene can be molded into many useful articles.

We claim:

1. A process for preparing a compound of the formula

wherein M is calcium, strontium or barium and R is vinyl, benzyl, or alkyl-substituted benzyl; said process comprising reacting by contacting (a) calcium, strontium or barium with (b) a solution of

wherein R has the aforesaid meaning, in an inert solvent.

2. The process defined in claim 1 wherein R is vinyl or benzyl.

3. The process defined by claim 1 wherein said process is conducted at a temperature of from about 0° to about 40° C.

4. The process defined by claim 3 wherein said temperature is from about 20° to about 30° C.

5. The process defined by claim 1 wherein said solvent is a cyclic aliphatic ether.

6. The process defined by claim 4 wherein (a) is calcium and (b) is a solution of tetravinyllead or tetrabenzyllead in tetrahydrofuran.

7. The process defined by claim 4 wherein (a) is strontium and (b) is a solution of tetravinyllead in tetrahydrofuran.

References Cited

UNITED STATES PATENTS 3,277,182  10/1966  Pampus et al. ____ 260—665 R

OTHER REFERENCES

Shapiro et al.: The Organic Compounds of Lead, Interscience Publishers, New York, N.Y.; 1968, pp. 89–90.

DANIEL E. WYMAN, Primary Examiner

A. P. DEMERS, Assistant Examiner

U.S. Cl. X.R.

260—93.5